March 15, 1927. 1,621,310
O. E. BORNHAUSER ET AL
LIQUID FEEDING MEANS FOR APPARATUS FOR PREPARING A MOIST
CEMENTITIOUS MIXTURE OR MASS
Filed June 18, 1924
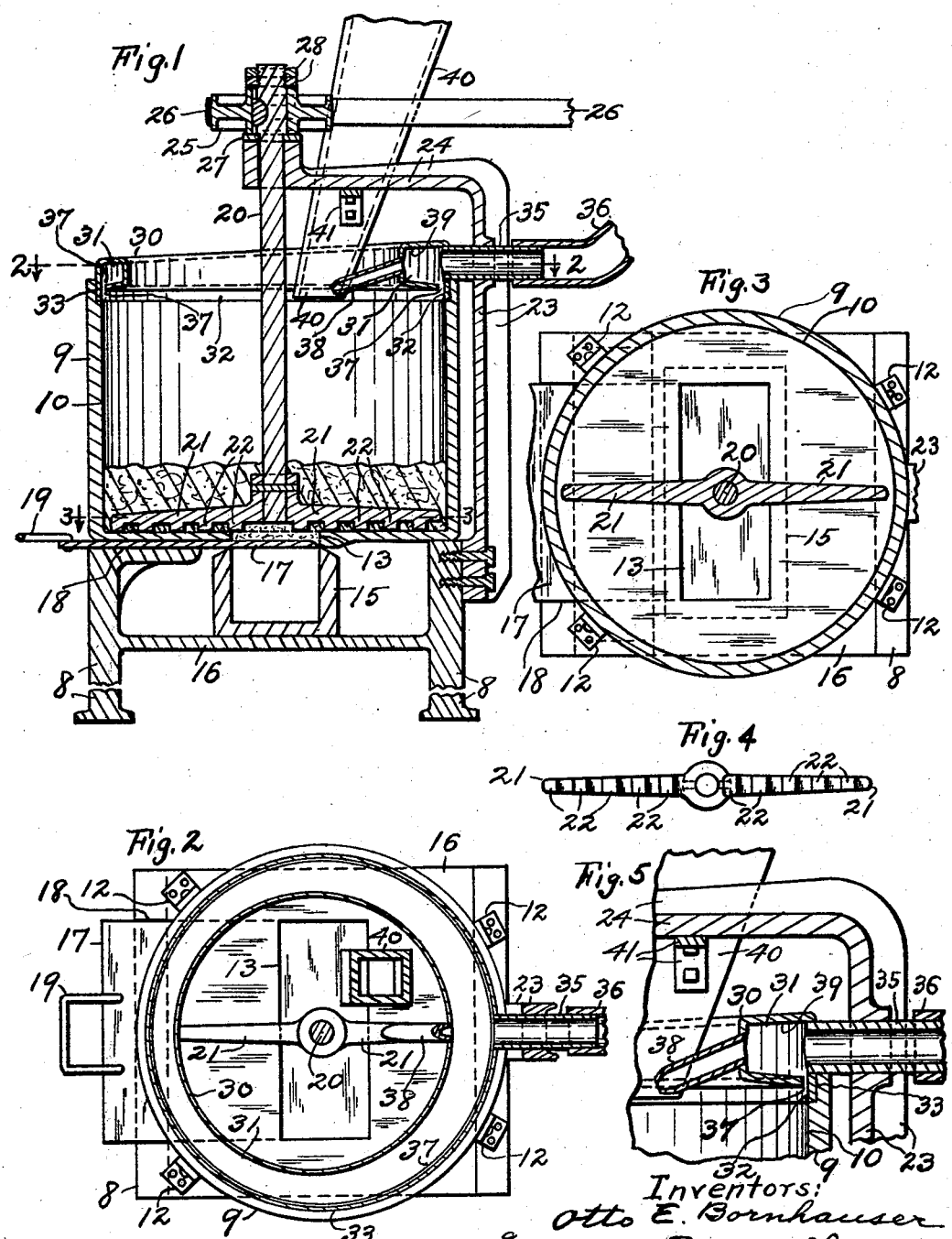
Inventors:
Otto E. Bornhauser
and John Edward Herman
By their Attorney.

Patented Mar. 15, 1927.                                                              1,621,310

UNITED STATES PATENT OFFICE.

OTTO E. BORNHAUSER AND JOHN EDWARD HERMAN, OF SANDUSKY, OHIO, ASSIGNORS TO THE HER-BORN ENGINEERING AND MANUFACTURING COMPANY, OF SANDUSKY, OHIO, A CORPORATION OF OHIO.

LIQUID-FEEDING MEANS FOR APPARATUS FOR PREPARING A MOIST CEMENTITIOUS MIXTURE OR MASS.

Application filed June 18, 1924. Serial No. 720,740.

This invention relates to improvements in liquid-feeding means for apparatus for preparing a moist cementitious mixture or mass, and pertains more especially to improved liquid-feeding means adapted to be mounted on the upper end portion of a mixing hopper and there employed in supplying to said hopper the water or liquid which is to be used in the preparation of a moist cementitious mass in the hopper.

One object of this invention is to produce improved means for distributing water or liquid internally of the hopper.

Another object is to prevent cementitious material from adhering to and accumulating on the inner surface of the surrounding wall of the interior mixing chamber of said hopper and on the outer circumferential surface of an upright stirring shaft arranged internally of said chamber.

Another object is to provide highly practical means whereby water or liquid may be supplied from above the level of the cementitious mass prepared in said chamber to the inner surface of the surrounding wall of and all round the chamber, so as to wash said surface and thereby prevent caking of cementitious material on said surface.

Another object is to provide means whereby water or liquid may be supplied from above the level of the cementitious mass prepared in said chamber to the outer circumferential surface of the hereinbefore mentioned shaft during the rotation of the shaft, so as to wash said surface and thereby prevent caking of cementitious material on said surface.

Another object is to render our improved liquid-feeding means simple and durable in construction, reliable in its operation, and not liable to get out of order.

With these objects in view, and to attain other objects hereinafter appearing, this invention consists in certain features of construction, and combinations and relative arrangements of parts, hereinafter described in this specification, pointed out in the claims, and illustrated in the accompanying drawings.

In said drawings, Figure 1 is a central vertical section of apparatus embodying our invention. Figs. 2 and 3 are horizontal sections taken along the line 2—2 and line 3—3 respectively in Fig. 1. Fig. 4 is a bottom plan of the stirring arms of the stirring shaft of said apparatus. Fig. 5 shows a portion of Fig. 1 and is drawn on a larger scale than Fig. 1.

Referring to said drawings, 8 indicates a stationary supporting frame constructed in any approved manner and forming the main portion of a supporting structure.

Upon the frame 8 is mounted a mixing hopper 9 having an interior mixing chamber 10 which is substantially circular in cross-section. Said hopper is rendered rigid with the frame 8 preferably through the medium of metal angle-plates or members 12 secured to said frame and to the hopper. The bottom of said hopper has a rectangular opening 13 extending vertically through and transversely of the central portion of said bottom and forming the outlet of the mixing chamber 10 and adapted to discharge substantially vertically downwardly into an empty mold 15 shown removably mounted, in Fig. 1, on a shelf or seat formed by a horizontally arranged member 16 of the frame 8.

Means for controlling communication through the discharge-opening or outlet 13 in the bottom of the mixing chamber 10 are provided and comprise a cut-off or valve consisting preferably of a metal plate 17 which is arranged substantially horizontally next below said bottom and engages a correspondingly arranged slideway 18 formed in the frame 8, and said cut-off or valve is large enough in dimensions to obstruct communication through said opening or outlet when said valve is in its extreme inner or closed position shown.

In its closed position the valve-forming plate 17 extends outwardly from the outer end of the slideway 18, and said plate is provided at its outer end with a handle 19. The empty mold 15 shown in Fig. 1 is open at the top and interposed between the seat 16 and the outlet 13 of the hopper 9 and in position to receive moist cementitious material from the mixing chamber 10 during the outward actuation of the valve 17 into an open position (not shown).

A substantially vertical shaft 20 is arranged centrally of the mixing chamber 10 and extends upwardly from within the lower portion of and above said chamber and at its lower end is provided with two laterally extending stirring arms 21 which are arranged at opposite sides respectively of the shaft and in proximity to the bottom of said chamber and extend into proximity to the surrounding wall of said chamber. Said arms 21 are preferably formed of a single metal piece secured to the shaft 20 in any approved manner.

Each stirring arm 21 preferably has teeth or projections 22 formed at the under side and spaced longitudinally of the arm, and the projections 22 of said arms are in such spaced relationship to the axis of the shaft that the paths, around said axis, of the projections of each of said arms alternate with the paths, around said axis, of the projections of the other of said arms.

As already hereinbefore indicated, the cut-off or valve 17 extends outwardly from the hopper 9 at one side of the hopper, and the supporting structure comprising the frame 8 is provided, at the opposite side and externally of the hopper, with an upright supporting member 23 extending above the hopper and having a laterally extending arm 24 which is arranged above and spaced from the hopper and extends around and affords lateral bearing to the stirring shaft 20 extending upwardly through the free end portion of and above said arm. Said shaft is operatively provided above the supporting arm 24 (see Fig. 1) with a pulley 25 for rotating the shaft, and said pulley is shown operatively engaged by a driving belt 26 actuated in any approved manner. The pulley-surrounded portion of the shaft 20 is shown somewhat larger in diameter than the remainder of the shaft. The pulley 25 is spaced somewhat upwardly from the supporting arm 24, and a collar or washer 27 surrounds the shaft next below and forms a seat for the pulley-surrounded portion of the shaft and rests on said arm. It will be observed, therefore, that the shaft 20 is supported from the arm 24. Nuts 28 are shown threaded onto said shaft above the pulley 25.

Our improved liquid-feeding means comprises a substantially horizontal annular liquid-distributing member 30 preferably made of metal and formed or arranged at the upper end of and supported from the hopper 9 adjacent and extending along the top edge of the hopper, and preferably said member 30 extends wholly around the stirring shaft 20. The member 30 has a substantially horizontal annular liquid-distributing interior chamber 31 surrounding the stirring shaft 20. Said liquid-distributing member 30 is arranged largely above the hopper 9, and the outer surrounding wall of the interior chamber 31 of said member 30 is extended downwardly, as at 32, below the bottom of said chamber. The downward extension 32 of said wall is annular and engages an annular recess 33 formed internally of the upper end portion of the hopper 9 and extending to the upper extremity of the hopper. The bottom of said recess 33 is engaged by the bottom edge of said downward extension 32 of said wall and therefore forms a seat for the member 30.

A liquid-conducting pipe 35, arranged at the upper end and at one side of the hopper 9, extends substantially horizontally through the upright supporting member 23 adjacent the top edge of the hopper and communicates, at its outer end, with a flexible hose or conduit 36 for supplying water or liquid to said pipe, and said hose or conduit preferably snugly embraces the outer end of but is removable from said pipe. Said pipe extends over and transversely of the adjacent portion of the top edge of the hopper and is welded or otherwise secured, at its inner end, to the member 30 and forms the inlet of and discharges into the chamber 31. The bottom of the chamber 31 is preferably arranged lower than the pipe or inlet 35 of said chamber and slopes downwardly toward the downward extension 32 of the outer surrounding wall of said chamber, and said bottom is spaced all round from said wall so as to form not only a downwardly discharging outlet 37 for said chamber but an outlet which extends circumferentially of and wholly around said bottom. It will be observed, therefore, that the chamber 31 has an annular outlet 37 formed between the circumferential edge of the bottom of said chamber and the downward extension or member 32 of the surrounding wall of said chamber, that said outlet is substantially concentric in relation to said wall and has an external diameter which measures substantially the same as the diameter of the mixing chamber 10, and that the member 32 of said wall forms the surrounding wall of and extends below said outlet, so that the surrounding wall of the annular outlet 37 of the chamber 31 extends below said outlet and constitutes a portion of the surrounding wall of the mixing chamber 10 and so that said outlet is arranged to discharge into said mixing chamber substantially at the circumference of and all round said mixing chamber and so that water discharged at said outlet from the chamber 31 flows down and washes said wall of said mixing chamber.

The liquid-distributing chamber 31 is preferably widest and highest at its inlet 35 at one side of the hopper 9 and measures the least in width at the opposite side of the hopper, and said chamber is gradually reduced in size transversely toward the last-mentioned side of the hopper so as to insure and facilitate a proper distribution of liquid to all portions of the annular outlet 37 of said chamber.

As already hereinbefore indicated, the inlet 35 of the liquid-distributing chamber 31 is formed at the outer circumferential upright wall of said chamber, and we would here remark that the member 30 is provided at the inner or opposite upright wall of said chamber, preferably at a point opposite said inlet, with a nozzle 38 communicating with said chamber and arranged and adapted to supply water to the outer circumferential surface of the stirring shaft 20 and extending from the last-mentioned wall downwardly toward said shaft. Said nozzle has its lower and discharging end in such spaced relationship to said shaft that a stream of water or liquid discharged from the nozzle shall impinge or strike against the outer circumferential surface of the shaft, and obviously water discharged from said nozzle toward and against said shaft during the rotation of the shaft will result in washing said shaft all round and prevent cementitious matter from adhering to or caking on said surface.

We would here remark that the liquid-distributing chamber 31 preferably has a substantially imperforate top wall 39 to prevent the overflow of water from said chamber and also to prevent the ingress, into said chamber, of stones, pieces of wood or other matter that would be more or less obstructive to the outlet 37 of said chamber.

A chute 40 for intermittently supplying cement and sand or dry materials to the mixing chamber 10 extends through the space surrounded by the liquid-distributing member 30, and said chute is arranged and adapted to discharge into said mixing chamber and is rigid with a bracket 41 secured to the arm 24. The valve 17 is, of course, actuated outwardly into its open position to supply cementitious material from the mixing chamber 10 to the empty mold 15 shown in Fig. 1, and said valve, immediately after said mold has been charged with cementitious material from the hopper 9, is again actuated into a closed position, and the charged mold is removed from under the outlet 13 of the hopper and replaced by an empty mold, whereupon dry materials from the chute 40 and water or liquid from the outlet 37 of the liquid-distributing chamber 31 and from the nozzle 38 are supplied to the mixing chamber 10 as required for the preparation of moist cementitious material for the next mold to be charged, and the stirring shaft 20 is continuously rotated.

What we claim is:—

1. Liquid-feeding means of the character indicated comprising an annular liquid-distributing member having a substantially horizontal annular liquid-distributing chamber which has a bottom which slopes downwardly in the direction of the outer circumference of said chamber, said chamber having a downwardly discharging annular outlet formed at the lower end of said bottom.

2. Liquid-feeding means of the character indicated comprising a substantially horizontal annular liquid-distributing member having a liquid-distributing chamber having a bottom which slopes downwardly in the direction of the outer circumference of said chamber, said chamber measuring more in width at one side than at the opposite side of the aforesaid liquid-distributing member and being gradually reduced in width toward the last-mentioned side of said member, and the liquid-distributing chamber having an inlet at its widest portion and also having an outlet formed at the lower end and extending circumferentially of the aforesaid bottom.

3. Liquid-feeding means of the character indicated comprising an annular liquid-distributing member having a liquid-distributing chamber which is formed and arranged to render it capable of extending substantially horizontally circumferentially of a mixing chamber and has an inlet and a downwardly discharging outlet which extends circumferentially of the bottom of the aforesaid liquid-distributing chamber, liquid-distributing member being provided with a nozzle which is in communication with said liquid-distributing chamber and arranged to discharge toward a point central in relation to the space surrounded by said liquid-distributing member.

4. Liquid-feeding means comprising a substantially horizontal annular liquid-distributing chamber having a downwardly discharging outlet formed at the bottom of the chamber, the surrounding wall of said outlet being extended downwardly below said outlet and arranged to constitute a portion of the surrounding wall of a mixing chamber.

In testimony whereof, we sign the foregoing specification.

OTTO E. BORNHAUSER.
JOHN EDWARD HERMAN.